United States Patent [19]
Horikawa

[11] Patent Number: 4,930,896
[45] Date of Patent: Jun. 5, 1990

[54] SURFACE STRUCTURE MEASURING APPARATUS

[75] Inventor: Yoshiaki Horikawa, Hachiouji, Japan

[73] Assignee: Olympus Optical Co., Ltd., Tokyo, Japan

[21] Appl. No.: 320,850

[22] Filed: Mar. 2, 1989

Related U.S. Application Data

[63] Continuation of Ser. No. 844,168, Mar. 26, 1986, abandoned.

[30] Foreign Application Priority Data

Mar. 27, 1985 [JP] Japan .................. 60-62265

[51] Int. Cl.⁵ ............................................. G01B 11/30
[52] U.S. Cl. .................................................. 356/376
[58] Field of Search ...................... 356/375, 376, 401; 250/201 AF

[56] References Cited

U.S. PATENT DOCUMENTS

| | | |
|---|---|---|
| 3,589,815 | 6/1971 | Hosterman . |
| 4,088,408 | 9/1978 | Burcher et al. ...................... 356/371 |
| 4,251,125 | 2/1981 | Minoura et al. ...................... 350/6.5 |
| 4,275,306 | 6/1981 | Kato et al. .......................... 356/401 |
| 4,367,009 | 1/1983 | Suzki ................................... 350/6.5 |
| 4,579,453 | 4/1986 | Makita ................................ 356/401 |

FOREIGN PATENT DOCUMENTS

| | | |
|---|---|---|
| 0094835 | 11/1983 | European Pat. Off. . |
| 2854057 | 6/1979 | Fed. Rep. of Germany . |
| 3220080 | 2/1984 | Fed. Rep. of Germany . |
| 58-194007 | 11/1983 | Japan . |
| 2135150 | 8/1984 | United Kingdom ................ 356/376 |

OTHER PUBLICATIONS

Communications, Surface Profile Measurement Using the Confocal Microscope, D. K. Hamilton and T. Wilson, pub. 28 Jan. 1982, PACS Nos.: 07.60.Pb,42,78-b, 46.30 Rc—pp. 5320-5322.

Primary Examiner—Richard A. Rosenberger
Attorney, Agent, or Firm—Cushman, Darby & Cushman

[57] ABSTRACT

In order to make possible a high-speed measurement of the surface structure of a sample of any shape or any weight and also to make feasible a direct observation of the surface portion requiring measurement, the surface structure measuring apparatus comprises: a laser light beam source; an objective lens collecting the laser light beam emitting from the light source onto the surface of the sample; a pair of light deflectors disposed at positions conjugate with the pupil of the objective lens, respectively, to perform two-dimensional scanning of the surface of the sample by altering the incidence angle of the laser light beam impinging onto the objective lens; an observation optical system incorporated between the objective lens and the light deflectors for the observation of the surface of the sample; focus detecting device receiving the light reflected at the surface of the sample for detecting a displacement of the surface portion of the sample requiring measurement from a predetermined focal position; and image processing and indicating device for indicating the structure of the measured surface of the sample based on the output delivered from the focus detecting device.

8 Claims, 6 Drawing Sheets

SURFACE STRUCTURE MEASURING APPARATUS

This is a continuation of application Ser. No. 06,844,168, filed Mar. 26, 1986, now abandoned.

BACKGROUND OF THE INVENTION (a) Field of the invention:

The present invention relates to a surface structure measuring apparatus.

(b) Description of the prior art:

Of late, non-contacting optical measuring systems have become employed for the measurement of surface structures. Among various optical section curve measuring systems those representing applications of the focus detecting method are attracting the attention of those concerned as having the possibility of elevating the degree of precision of measurement and of making the apparatus compact. Of these systems, there are those which utilize the focus detecting method such as the critical angle technique, the astigmatism technique, the pupil dividing technique, etc. as the techniques which are presently proposed Description will be made first of the system which utilizes the critical angle technique. FIG. 1 is an illustration showing the principle of the critical angle technique. In case the measurement surface is located at a focal position 2 of an objective lens 1, the light 5 which is reflected at the measurement surface is rendered to a parallel light 6 by the objective lens 1 and enters into a critical angle prism 7. By setting the prism 7 so as to perform total reflection of the incident light at such a time, a same amount of light arrives at two photodiodes 8 and 9, respectively. Also, in case the measurement surface is located at a position 3 which is closer to the objective lens 1 rather than the focal position is close to the objective lens 1, the reflected light, after passing through the objective lens 1, will become a diverging light 10 and will enter into the critical prism 7. At such a time, there arises a difference in the incidence angle of light on one side of the optical axis relative to the other side thereof. Therefore, the light located on that side which does not satisfy the total reflection conditions will travel to the outside of the prism 7 as being a light 11, whereas the light located on that side of the optical axis which satisfies the total reflection conditions is reflected totally and arrives mainly at a photo-diode 9. Accordingly, at such a time, only a small amount of light arrives at the photo-diode 8. Also, in case the measurement surface is located at a position 4 which is farther from the objective lens 1 rather than the focal position 2 is far from the objective lens 1, the situation is just the reverse of the instance wherein the measurement surface is located at the position 3, and only a small amount of light will arrive at the photo-diode 9. Accordingly, by reading out the outputs of these two photo-diodes 8 and 9 by means of an operation amplifier 12, there is obtained a displacement-to-output characteristic as shown in FIG. 2.

FIG. 3 shows an optical system of Model No. HIPO-SET 10 (tradename) made by Kabushiki Kaisha Kosaka Kenkysho as an example of the prior art surface structure measuring apparatus utilizing the abovesaid critical angle technique. The infrared laser beam emitting from a laser diode 13 passes through a collimator lens 14, a deflected light beam splitter 15, a $\lambda/4$ plate 16 and an objective lens 17, and impinges onto a sample 18. The reflected light beam, in turn, passes through the objective lens 17, the $\lambda/4$ plate 16, the deflected light beam splitter 15 and a beam splitter 19, and impinges onto a critical angle prism 20 or 21. Two pairs of photo-diodes 22, 23 and 24, 25 are provided on the rear side of the critical angle prisms 20 and 21, respectively. From their respective outputs, there is detected the position of the sample 18 in the optical axial direction. And, by performing the scanning the surface of the sample by moving the sample 18 mechanically, its surface structure can be detected.

FIGS. 4A, 4B and 4C are illustrations showing the principle of the astigmatism technique. This is a technique arranged so that a cylindrical lens is disposed rearwardly of an objective lens not shown to impart astigmatism to the optical system so that the variation of the sectional structure of the bundle of light caused by the aberration or shifting of the measurement surface from the focal position is caught by a detector. More particularly, in case the optical system contains astigmatism, it will be noted that, when a spot image coming from a spot light source such as a laser impinges, the shape of this spot image will vary as from the shape 26 onto the shape 27 and to the shape 28 in the foreground of the focal position, in the focal position and in the background thereof relative to those as shown in FIGS. 4A, 4B and 4C, respectively. By detecting these images with quadrant detectors 29, 30, 31 and 32 and by subjecting them to arithmetic operation: $(V_{29}+V_{31})-(V_{30}+V_{32})$, there is obtained an output-to-displacement characteristic similar to that of FIG. 2, and thus the focal point can be detected. Here, the values of respective V's represent the outputs of the detectors assigned with corresponding reference numerals.

FIG. 5A shows the optical system of an example of the surface structure measuring apparatus utilizing the abovesaid principle of astigmatism. The laser light beam emitting from a laser light source 33 passes through a spatial filter 34 and impinges onto a deflected light beam splitter 35, and after passing through a $\lambda/4$ plate 36 and through an objective lens 37, it impinges onto a sample 38. The reflected light passes through the objective lens 37, the $\lambda/4$ plate 36, the deflected light beam splitter 35 and a beam splitter 39, and impinges onto cylindrical lenses 40 and 41. These cylindrical lenses 40 and 41 are provided there to develop astigmatism, respectively. In the background of these cylindrical lenses 40 and 41, there are provided detectors 42 and 43, respectively. These detectors are each comprised of four photo-diodes 44, 45, 46 and 47, respectively, as shown in FIG. 5B, and they detect the focal position in accordance with the principle which has been described in connection with FIGS. 4A, 4B and 4C. And, by mechanically moving the sample in the arrow direction, amounts of defocus corresponding to the surface structures of the sample thus moved are detected by these detectors 42 and 43. By converting these outputs to the amounts of displacement in accordance with the relationship mentioned in FIG. 2, the surface structure can be measured. Focusing is obtained by driving either a stage or the objective lens by a feedback circuit using the focal position detection signal of said device as an error signal. In the surface structure measuring method, however, arrangement is provided so that focal position detection signal itself is grasped as the variation of the surface structure, and measurement is made based thereon.

FIGS. 6A, 6B and 6C are illustrations of an image showing the principle of the pupil dividing technique.

FIG. 6B shows the instance wherein focus is obtained. The light coming from the object spot 51 passes through an objective lens 48, and thereafter the bundle of light is reduced to one half by a light interrupting plate 49 which shuts one half of the pupil of said lens. When focus is obtained, an image is produced in the center of a detector 50. FIG. 6A shows the instance wherein the object spot 52 is displaced closer toward the objective lens 48 from the focal position. An image is produced at a position located upper than the center of the detector 50 by virtue of the light bundle which has been reduced to one half by the light interrupting plate 49. FIG. 6C shows the instance wherein the object spot 53 is displaced from the focal position to a position farther away from the objective lens 48. In this instance, an image is produced at a position below the center of the detector 50 by virtue of the bundle of light which has been reduced to one half by the light interrupting plate 49. By blocking one half of the pupil in such a manner as stated above, it is possible to convert the displacement of the focal position to the shifting of the position of the image. Accordingly, by constructing the detector 50 either by a partial detector or by a position detector, the detection of focal position becomes feasible. This principle is disclosed in the Japanese Patent Preliminary Publication No. Sho 58-194007.

FIG. 7 shows the optical system of an example of the surface structure measuring apparatus utilizing the principle of said pupil dividing technique. The laser light beam emitting from a laser light beam source 54 passes through a spatial filter 55, a collimator lens 56, a deflected light beam splitter 57, a λ/4 plate 58 and an objective lens 59, and impinges onto a sample 60. The light reflected at the sample 60 passes through the objective lens 59, the λ/4 plate 58 and the deflected light beam splitter 57, and impinges onto a pupil dividing mirror 61. The bundle of light which has lost its one half by the pupil dividing mirror 61 is caused by a focusing lens 62 to impinge onto photo-diodes 63 and 64. Also, the bundle of light which is reflected by only one half of the original bundle of light by the pupil dividing mirror 61 is caused by a focusing lens to impinge onto photo-diodes 66 and 67. Accordingly, by carrying out an arithmetic operation: $(V_{63}-V_{64})+(V_{66}-V_{67})$, it is possible to detect the focal position by relying on the principle described in connection with FIGS. 6A, 6B and 6C. And, when the sample 60 is moved mechanically in the arrow direction, the focus detection signal varies. However, its values are to be noted to indicate the surface structure by giving reference to the relationship shown in FIG. 2

Here, the respective outputs $V_{63}$, $V_{64}$; $V_{66}$, $V_{67}$ which are produced by the respective paired photo-diodes 63, 64; 66, 67 vary by virtue of the variation of the rate of reflection at the measurement surface. However, by normalizing them by the sum of the signals as by:

$$\frac{V_{63}-V_{64}}{V_{63}+V_{64}} + \frac{V_{66}-V_{67}}{V_{66}+V_{67}}$$

it is possible to compensate for the fluctuation of the amount of light caused by the variation of the rate of reflection. Also, instead of the halved photo-diodes, there may be employed, for example, a semiconductor position detector. It should be noted here also that two pairs of detecting optical systems are provided in FIGS. 3, 5A, 5B and 7 to cancel errors caused by an inclination of the sample.

However, the above-described techniques of the prior art invariably use a laser beam only on the axis of the optical system, and scanning is performed by mechanically shifting the sample. As a result, there have been the drawbacks such that the measurement speed is slow, that the shape, the weight, etc. of the sample are limited, and further that the measurement surface cannot be observed

SUMMARY OF THE INVENTION

Therefore, a primary object of the present invention is to provide a surface structure measuring apparatus which permits high-speed measurement, and which allows a drastic expansion of the permissible scope of the shape, weight, etc. of samples which require measurement.

According to the present invention, this object is attained by the provision of a light source, an object lens for collecting the light emitting from the light source onto the surface of a sample, a light deflecting means disposed between the light source and the objective lens and capable of making two-dimensional scanning on the surface of the sample by altering the angle of the incident light entering into the objective lens, and a focus detecting means receiving the light reflected at the surface of the sample to detect the displacement of the sample surface from a predetermined focal position.

Accordingly to a preferred formation of the present invention, the light deflecting means is disposed at the position of the pupil of the optical system. Whereby, even in case the beam of light is scanned by moving the light deflecting means for the purpose of scanning, the optical axis is held at a constant position in the scanning system, and thus there arises no measurement errors.

According to another preferred formation of the present invention, an observation optical system is incorporated between the light deflecting means and the objective lens to observe the surface of the sample. Whereby, it becomes always possible to make direct observation of the measurement surface.

According to still another preferred formation of the present invention, an image processing and indicating means capable of indicating the surface structure of the sample which has been measured is connected to the focus detecting means. Whereby, it becomes possible to measure the surface structure quickly in a simplified manner and with a high degree of precision.

This and other objects of the present invention as well as the features and advantages thereof will be apparent from the following detailed description of the preferred embodiments when taken in conjunction with the accompanying drawings.

DETAILED DESCRIPTION OF THE PREFERRED EMBODIMENTS

Figure 8:
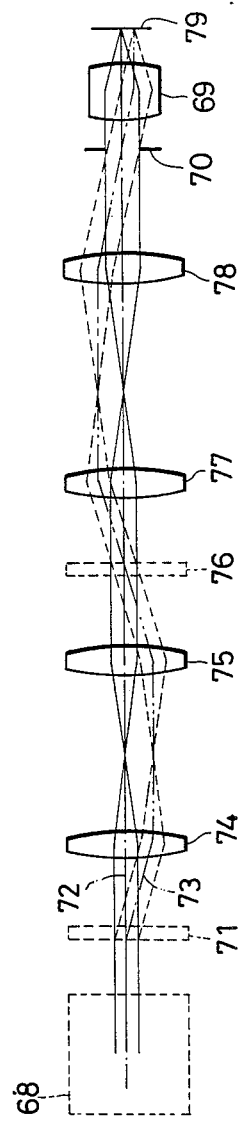
FIG. 8 is an illustration showing the surface structure measuring optical system of the surface structure measuring apparatus according to the present invention.

The present invention will hereunder be described in detail based on an illustrated embodiment. In FIG. 8, reference numeral 68 represents a surface structure measuring optical system including a laser light beam source and an optical system for detecting and measuring the light coming back from a sample as those shown in FIG. 3, FIGS. 5A and 5B, FIGS. 6A, 6B and 6C. A laser beam coming from a surface structure measuring optical system 68 impinges onto a light deflector 71 which is disposed at a position conjugate with a pupil 70 of an objective lens 69. The light deflector 71 is comprised of either a rotary polygonal mirror, a galvanometric mirror, an acoustic device or other devices. In case no deflection is provided, the laser beam advances along an optical axis 72. In case deflection is performed, i.e. in case a laser beam is scanned, it should be noted that, since the light deflector 71 is provided at the position of the pupil, the orientation of the laser beam is in agreement with the off-axial principal ray 73, and the center of the laser beam also is in agreement with the off-axial principal ray 73. These laser beams pass through pupil relay lenses 74 and 75 and impinge onto a light deflector 76 which is provided likewise at the position of the pupil. If this light deflector 76 is assumed to perform a scanning in the direction of X, i.e. in the vertical direction, among the two-dimensional scanning, the earlier-mentioned light deflector 71 will conduct the scanning in the direction of Y, i.e. the scanning in the horizontal direction. It should be noted here that there may be employed a single light deflector provided that it is able to perform deflection in both directions of X-Y. Also, in the instance wherein only one-dimensional scanning is performed, the use of a single light deflector is enough. The laser beams which have been scanned two-dimensionally by the light deflectors 71 and 76 are caused to impinge onto the pupil of the objective lens 69 by virtue of a pupil projecting lens 77 and a focusing lens 78. The off-axial laser beam which is formed by the light deflectors 71 and 76 also enters exactly into the pupil 70 of the objective lens 69. And, these laser beams produce, on a sample 79 by the objective lens 69, a spot which is limited by diffraction. The laser beam which is reflected at the sample 79 travels reversely its initial course of incidence to the sample and returns to the surface structure measuring optical system 68. Since the beam returns by retracing the same optical path, it should be noted that even the laser beam which is scanned off the axis will not fluctuate when it returns to the surface structure measuring optical system. Accordingly, the surface structure measuring optical system 68 may utilize a perfectly ordinary system.

Figure 10:
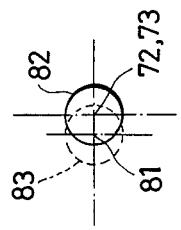
FIG. 10 is an illustration which represents the instance wherein the state of FIG. 9 is indicated on a plane crossing the optical axis at right angles.
Figure 9:
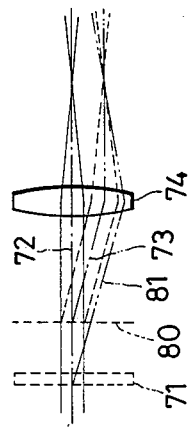
FIG. 9 is an illustration showing the instance wherein the light deflecting means is not provided at the position of the pupil in the above-mentioned optical system.

FIG. 9 concerns the regions of the light deflector 71 and the pupil relay lens 74 in FIG. 8 and shows the instance wherein the light deflector 71 is not provided at the position 80 of the pupil. When the incident laser beam is deflected by the light deflector 71, the laser beam will have its center at 81 and it does not coincide with the off-axial principal ray 73 which is determined by the pupil of the objective lens. This shows that the offaxial laser beam does not impinge exactly onto the pupil of the objective lens. FIG. 10 mentions the above thing on a plane which crosses the optical axis at right angles. Reference numeral 82 denotes the pupil of the objective lens, and this Figure shows that the center of the pupil coincides with the optical axis 72 or the off-axial principal ray. In this case, if the light deflector 71 is provided at the position 80 of the pupil or at a position conjugate with the pupil as proposed above, the scanned laser beam will be brought into agreement with the off-axial principal ray 73 and will impinge exactly onto the pupil 82 of the objective lens. However, if the light deflector 71 is not provided at the position 80 of the pupil as shown in FIG. 9, the center 81 of the laser beam will not agree with the off-axial principal ray 73 so that the flare 83 of the laser beam will not enter exactly into the pupil 82 and will cause vignetting.

As discussed above, in an optical system which does not give consideration to the pupil, it is not possible to maintain or support any information of the pupil, so that it is not possible to use the focus detecting method which is based on the critical angle technique which directly utilizes information about pupil or to use the focus detecting method based on the pupil dividing method for off-axial beams. Not only them alone, but also the astigmatism technique likewise will develop errors. In good contrast thereto, the surface structure measuring apparatus according to the present invention adopts a scanning optical system wherein consideration is given to the pupil, so that it has become possible to realize, by relying on the light beam scanning system, the above-described surface structure measurement which relies on the abovesaid focus detecting method.

Figure 11:
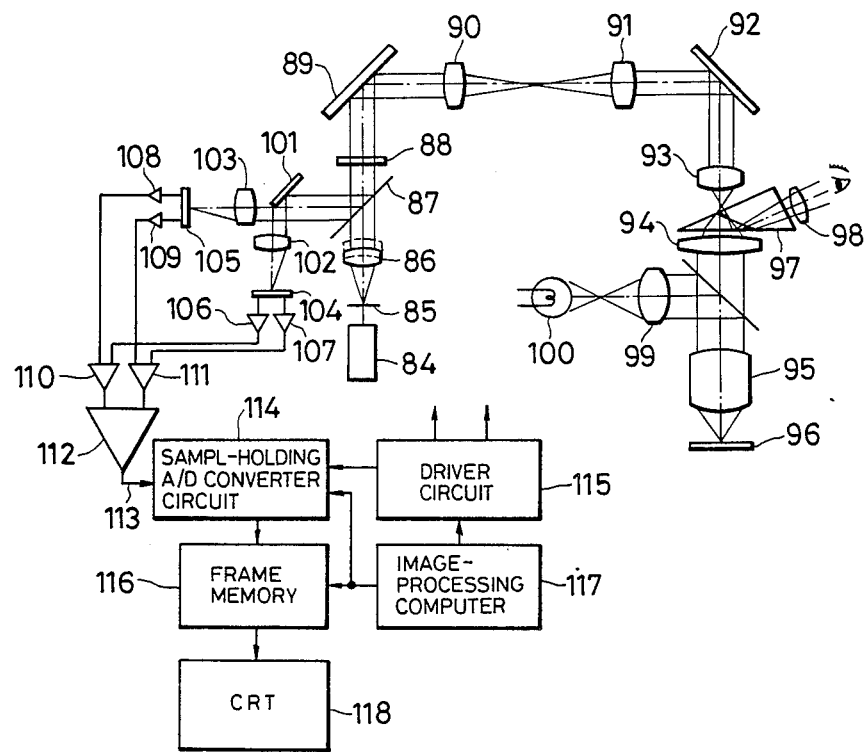
FIG. 11 is an illustration showing the optical system and the processing circuitry of an embodiment of the surface structure measuring apparatus of the present invention which utilizes the pupil dividing technique.

FIG. 11 shows, as another embodiment, the optical system and the processing circuitry of the surface structure measuring apparatus utilizing the pupil dividing technique. A laser beam emitting from a laser light beam source 84 passes through a spatial filter 85, a collimator lens 86, a deflected light beam splitter 87 and a λ/4 plate 88, and impinges onto a galvanometric mirror 89 which is placed at the position of the pupil for the purpose of scanning in the X direction, and successively therefrom, the laser beam passes through pupil relay lens 90 and 91, and impinges onto a polygonal mirror 92 which is placed at the position of the pupil for scanning in the Y direction. The beam further passes through a pupil projection lens 93 and a focusing lens 94, and impinges onto an objective lens 95, and forms, on a sample 96, a spot which is limited by diffraction, i.e. an optical probe. Here, a prism 97, an eyepiece 98, a condenser lens 99 and a lamp 100 from an observation optical system which allows a visual observation of the sample 96. Whereby, the state of the region of the sample 96 requiring measurement can be confirmed with one's eyes. The objective lens 95 may be changeable so that they are altered of its type and magnification depending on the intended purposes.

The reflected light coming from the sample 96 returns to the deflected light beam splitter 87 by retracing the same course which the beam of light has taken initially to impinge onto the sample. Furthermore, the bundle of light of the beam is divided by a pupil dividing mirror 101, and the resulting divided beams pass through focusing lenses 102 and 103 and impinge onto semiconductor position detectors 104 and 105, respectively. These semiconductor position detectors are connected to the below-mentioned image processing and indicating means, respectively. The spot positions which have been measured by these semiconductor position detectors 104 and 105 are passed through pre-amplifiers 106, 107; 108, 109 and adders 110, 111 and are inputted to a differential amplifier 112, respectively. An analogous detection signal 113 outputted from the differential amplifier 112 is inputted to a sample-holding A/D converter circuit 114 to be digitalized thereat. This circuit 114 is synchronous with a synchronous signal delivered from a driver circuit 115 which is intended to drive the galvanometric mirror 89 and the polygonal mirror 92, and said circuit 114 stores a two-dimensional image in a frame memory 116. Reference numeral 117 represents an image-processing computer, and it carriers out various kinds of processing such as the processing of a bird's eye view, and indicates the result of the measurement of the surface structure on a CRT 118 or prints out the result.

Also, by constructing the collimator lens 86 with a zoom lens as shown by chain line so as to adjust the diameter of the light beam, it is possible to alter the diameter of the optical probe without requiring alteration of the magnification of the objective lens 95.

Figure 1:
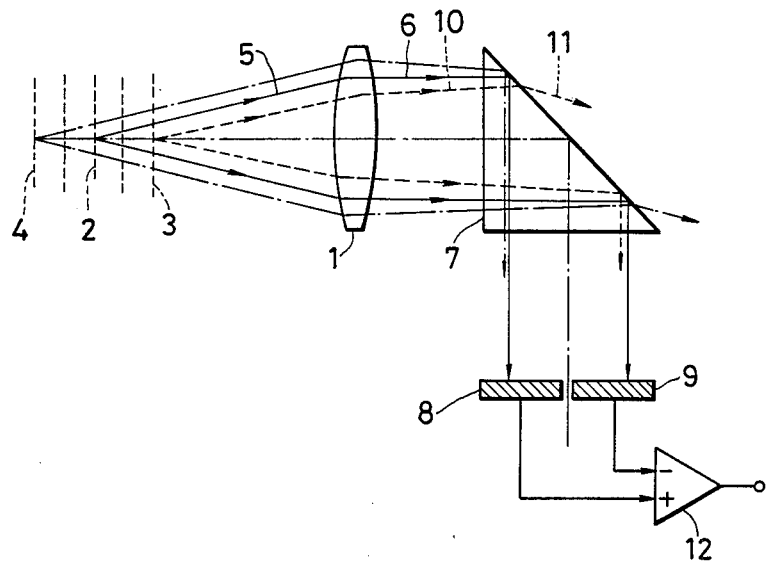
FIG. 1 is an illustration showing the principle of the critical angle method.
Figure 2:
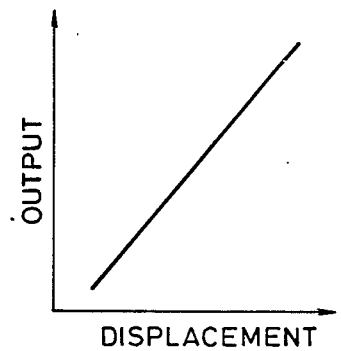
FIG. 2 is an illustration showing the displacement-to-output characteristic of the photo-diode in the above-mentioned method.
Figure 3:
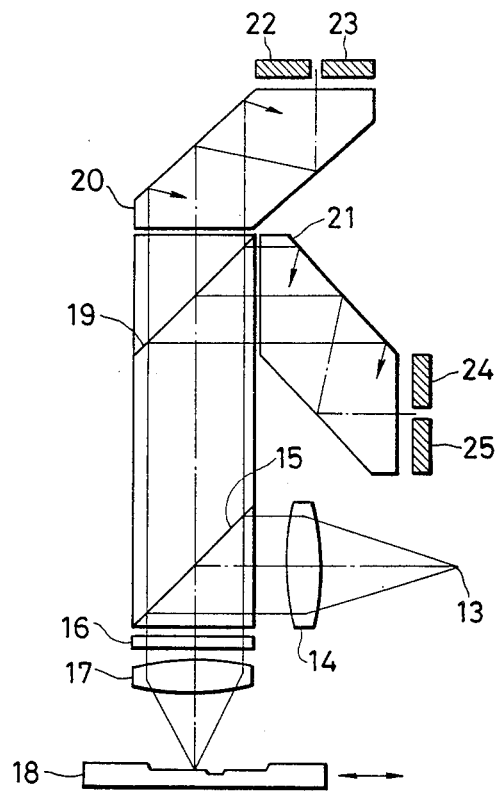
FIG. 3 is an illustration showing the optical system of the conventional surface structure measuring apparatus utilizing the critical angle method.
Figure 4A:
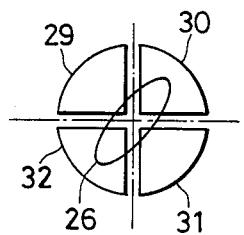
FIGS. 4A, 4B and 4C are illustrations showing the principle of the astigmatism technique.
Figure 4B:
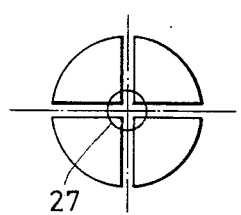
Figure 4C:
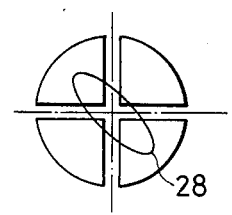
Figure 5A:
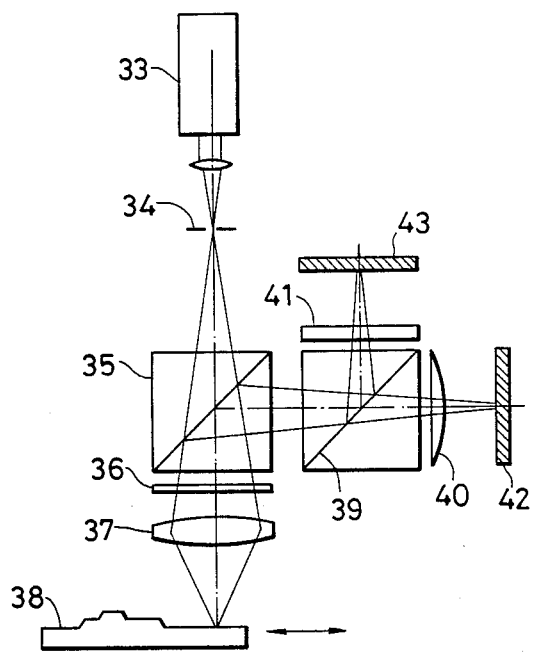
FIGS. 5A and 5B are illustrations showing the optical system of the conventional surface structure measuring apparatus utilizing the astigmatism technique.
Figure 5B:
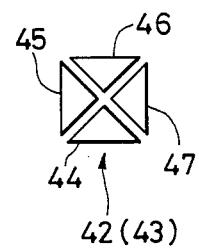
Figure 6A:
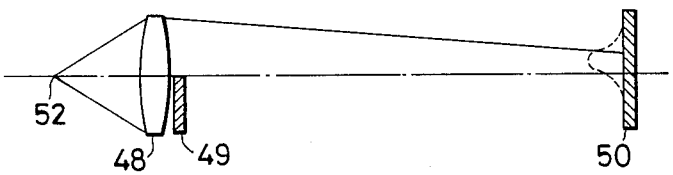
FIG. 6A, 6B and 6C are illustrations showing the principle of the pupil dividing technique.
Figure 6B:
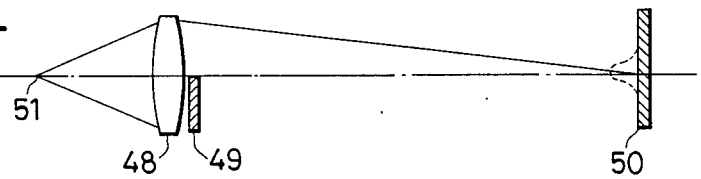
Figure 6C:
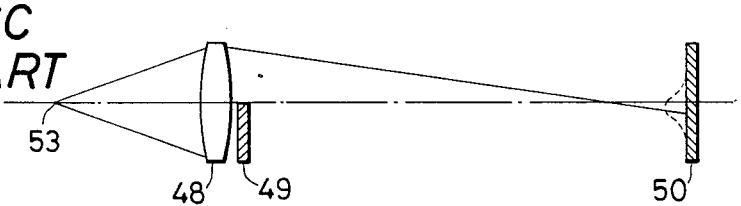
Figure 7:
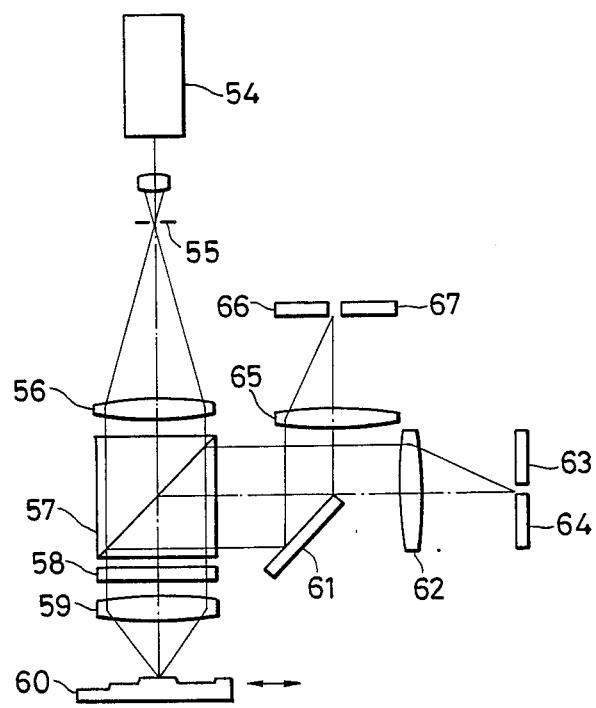
FIG. 7 is an illustration showing the optical system of the conventional surface structure measuring apparatus utilizing the pupil dividing technique.

It should be noted here that the detecting system may adopt the critical angle technique and the astigmatism technique which are shown in FIGS. 3 and 5A, respectively.

What is claimed is:

1. A surface structure measuring apparatus for measuring a surface profile of an object, comprising:
   a light source;
   an objective lens for collecting light emitted from said light source onto a measurement point on a surface to be measured;
   at least one light deflecting means disposed between said objective lens and said light source;
   optical path splitting means disposed between said light source and said light deflecting means, and positioned closer to said light source than said light deflecting means;
   focus detecting means disposed on an optical path split by said optical path splitting means; to detect an amount and direction of a displacement of a collecting point of light reflected from the surface to be measured along the optical axis caused by a displacement of said measurement point along the optical axis from a predetermined position on the optical axis; and
   at least a pupil relay lens disposed so as to make an exit pupil of said objective lens conjugate with said light deflecting means,
   said light deflecting means being effective to vary the travelling direction of said light emitted from said source with the result that the angle of light incident on said objective lens changes and thereby the collecting point of the light moves in a direction perpendicular to the optical axis on said surface to be measured.

2. A surface structure measuring apparatus according to claim 1, in which said focus detecting means is adapted to perform focus detection by use of the critical angle method.

3. A surface structure measuring apparatus according to claim 1 in which said focus detecting means is adapted to perform focus detection by use of the astigmatism method.

4. A surface structure measuring apparatus according to claim 1, in which said focus detecting means is adapted to perform focus detection by use of the pupil dividing method.

5. A surface structure measuring apparatus according to claim 1, further comprising collimating means disposed between said light source and said optical path splitting means for changing the light emitted from said light source to parallel rays.

6. A surface structure measuring apparatus according to claim 1, 2, 3, 4, or 5 further comprising:
   an observation light source;
   a first beam splitter disposed in a light path between said objective lens and one of said light deflecting means, positioned closest to said objective lens, to lead the light coming from said observation light source onto the surface to be measured through said objective lens;
   a second beam splitter disposed in a light path between said first beam splitter and said light deflecting means, positioned closest to said objective lens, to take out from the light path at least a part of light reflected from the surface to be measured; and
   an eyepiece disposed in a light path of the light taken out by said second beam splitter.

7. A surface structure measuring apparatus according to claim 1, 2, 3 or 4, further comprising:
   image processing and indicating means connected with said focus detecting means to indicate the structure of the measured surface of the sample.

8. A surface structure measuring apparatus according to claim 1, further comprising:
   said light deflecting means includes a pair of first and second light deflecting members disposed between said objective lens and said optical path splitting means;
   a first relay lens disposed between said first light deflecting means and a pupil of said objective lens so that they are optically conjugate with each other; and
   a second relay lens disposed between said first and second light deflecting members so that they are optically conjugate with each other,
   said light emitted from said light source being such that after its travelling direction is varied in a certain plane by said second light deflecting member, the travelling direction is further varied in a plane normal to said certain plane by said first light deflecting member, with the result that an incident angle of light incident on said objective lens changes and thereby the collecting point of the light moves in two directions intersecting with the optical axis at right angles on said surface to be measured.

* * * * *

UNITED STATES PATENT AND TRADEMARK OFFICE
CERTIFICATE OF CORRECTION

PATENT NO. : 4,930,896

DATED : June 5, 1990

INVENTOR(S) : HORIKAWA, Yoshiaki

It is certified that error appears in the above-identified patent and that said Letters Patent is hereby corrected as shown below:

Claim 1, Column 7, Line 52, after "and" (first occurrence) insert -- one of --; after the comma, delete "and".

Column 7, Line 53, change "closer" to -- closest --

Column 7, Lines 53 and 54, delete "than said light deflecting means".

Signed and Sealed this

Twenty-second Day of October, 1991

Attest:

HARRY F. MANBECK, JR.

*Attesting Officer*      *Commissioner of Patents and Trademarks*